April 28, 1931.  D. MORRIS  1,802,825
AEROPLANE
Filed Nov. 5, 1927  2 Sheets-Sheet 1
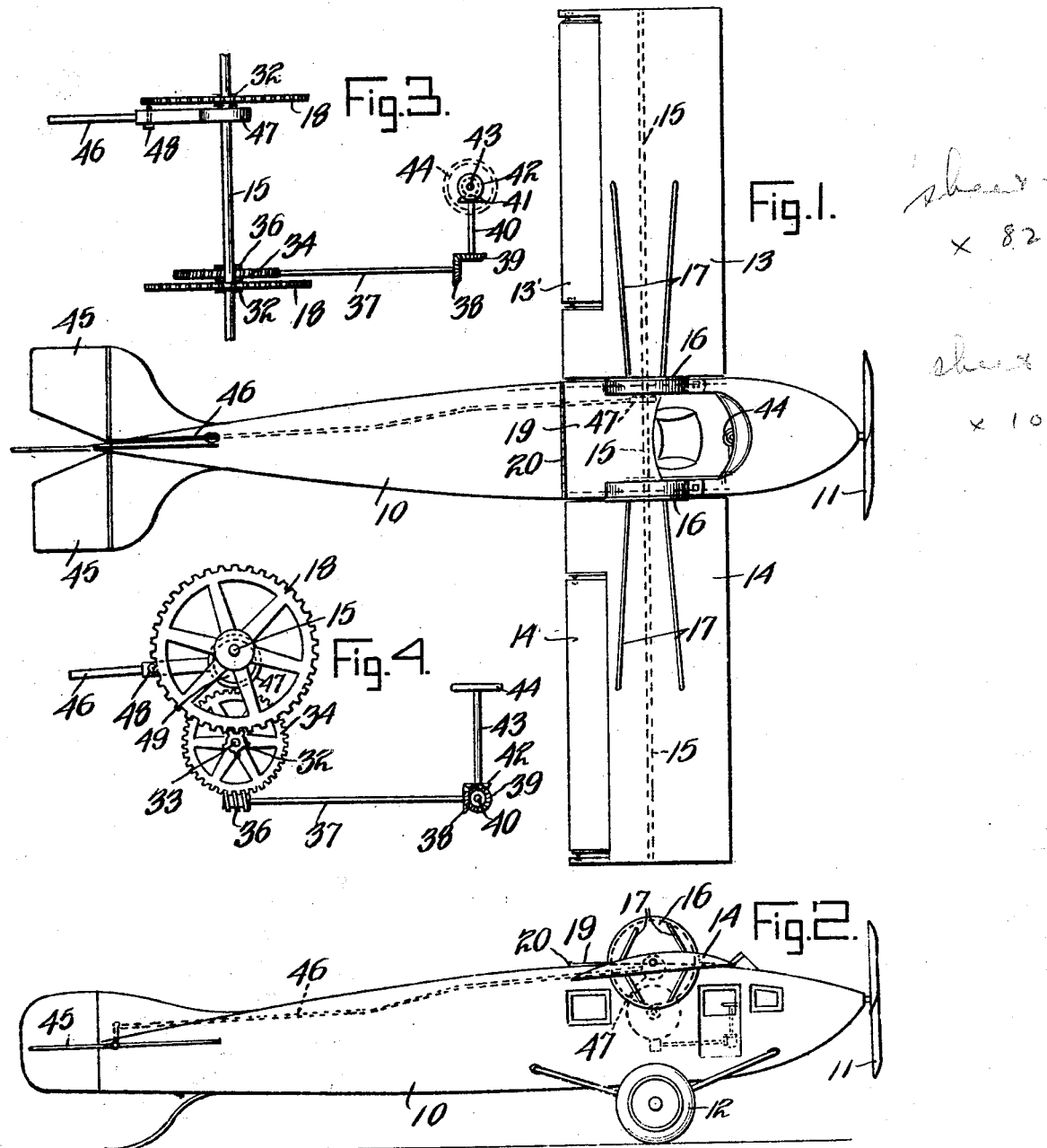
Inventor
Daniel Morris

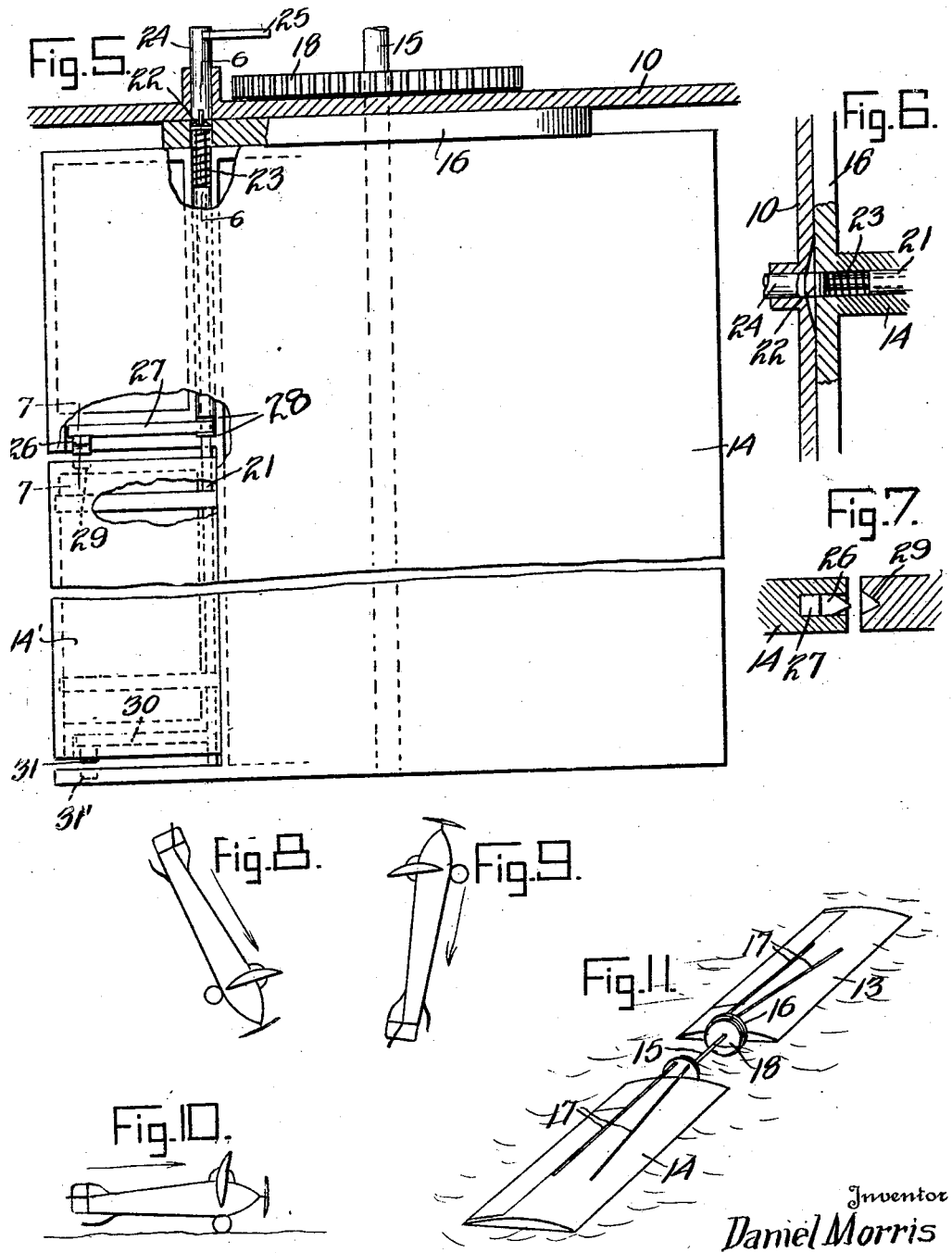

Patented Apr. 28, 1931

1,802,825

UNITED STATES PATENT OFFICE

DANIEL MORRIS, OF ST. PETERSBURG, FLORIDA, ASSIGNOR OF ONE-HALF TO ALICE A. NOONAN, OF NEW YORK, N. Y.

AEROPLANE

Application filed November 5, 1927. Serial No. 231,291.

My invention relates to improvements in aeroplanes and it is an object of the invention to provide an aeroplane having one or more pairs of wings pivotally and detachably mounted, adapted to be operated to serve as a brake for stopping the machine or for bringing the plane out of a tail spin or nose dive and which wings when detached may be used as a float. Another object of the invention is to provide the revolvable wings with ailerons and with means for operating said ailerons which means does not interfere with the rotation of the wings, all as will be hereinafter more fully described and claimed.

Referring to the accompanying drawings which are made a part hereof and on which similar reference characters indicate similar parts, Figure 1 is a top plan view illustrating one application of my invention, Figure 2, a side elevation, Figure 3, a detail top plan view of the steering assembly.

Figure 4, a detail side elevation of the steering assembly,

Figure 5, a detail fragmentary top plan view of the operating means for the ailerons, Figure 6, a section on the line 6—6 of Fig. 5, Figure 7, a section on the line 7—7 of Fig. 5, Figures 8, 9 and 10, diagrammatic views of the plane with the wings in various speed checking positions, and Figure 11, a perspective of the wings detached and in use as a raft.

In the drawings reference character 10 indicates the body or fuselage of an aeroplane of the usual construction provided with a propeller 11 and landing gear 12. Wings 13 and 14 are provided one on each side of the fuselage, said wings being mounted in spaced end to end alinement upon a straight rod or shaft 15 which extends throughout the length of the wings and forms a connection therefor. A pair of circular disks 16 are mounted on the shaft 15 at the inner ends of the wings 13 and 14 and serve to brace and support the wings and serve also as a support for braces or guy-wires 17 which engage said disks at one end and at their opposite ends engage the wings 13 and 14.

A pair of gears 18 are also carried by the shaft 15 in slightly spaced relation from the said disks inwardly of the same whereby rotation of the gears causes rotation of the shaft 15. The shaft 15 is disposed in bearings or sockets in the upper portion of the sides of the body of the plane.

Any desired easily releasable clamping means may be provided for securing the shaft 15 in its bearings in the fuselage however I have shown the cover 19 for the cockpit pivoted at 20 extending around said shaft and also around the gears 18 for maintaining the shaft in fixed position on the body or frame of the plane. The free ends of the clamps may be held in any desired manner so that they may be readily and quickly released.

The wings 13 and 14 are preferably formed hollow and are provided with tanks for the carrying of fuel, the fuel being fed from the tanks by means of flexible hose or conduits from which tanks the fuel may be dumped in order that the tanks may be used as a float. The wings 13 and 14 are each provided at their rear edges with ailerons or movable edge portions 13′ and 14′ mounted upon a longitudinally disposed shaft 21 (see Fig. 5) which extends through each wing from end to end and is provided on its inner end with a head 22 held in projected position by means of a spring 23, a stub shaft 24 being mounted in the frame and having an operating arm 25 by means of which the stub shaft 24 is rotated. The cooperating contacting portions of the head 22 and stub shaft 24 are complementary formed in any desired manner to prevent relative rotation so that when the stub shaft 24 is oscillated the shaft 21, carrying the aileron, will similarly oscillate the aileron.

Means is also provided for locking the ailerons in fixed position when the wings are tilted out of normal position. The rear or fixed portion of the wing is provided with a pin or projection 26 on an arm 27 swiveled between collars 28 on the shaft 21. Said pin 26 is adapted to extend into a socket 29 for holding the wing and aileron in alinement.

In order to hold the outer corner of each aileron I provide the same with an arm 30 carrying a pin 31 similar to the pin 26 for engaging the socket 31' said arm being fixed on the shaft 21. It will be understood that the arms 27 and 30 move longitudinally of its wing into and out of fixed engagement therewith as the shaft 21 on which the aileron is splined moves out of and into engagement with the stub shaft 24. The ailerons are only operable when the wings are in a definite position or in the position in which the stub shaft 24 registers with the head 22 of the shaft.

The gears 18 on the shaft 15 cooperate with a smaller pair of pinions 32 on the lower parallel shaft 33 and the shaft 33 is provided with a larger gear 34 which engages a worm 36 mounted upon a shaft 37 having a bevel gear 38 on its end opposite the worm 36 which bevel gear 38 cooperates with a similar gear 39 on the shaft 40 and the inner bevel gear 41 on said shaft operates a cooperating gear 42 on a shaft 43 rotatable by a hand wheel 44. By this construction the rotation of the hand wheel 44 will be transmitted through the train of gears to the wings of the plane so that they may be tilted at any desired angle through a complete circle. At the same time, pressure upon the wings will not move them on account of engagement of the gear 34 with the worm 36.

Means is provided for operating the tail controls so that the horizontally disposed portions or elevators 45 of the tail will be inclined in a manner to cooperate with the angle at which the wings are disposed. Such means comprises a control rod 46 which has its rear end connected with the horizontally disposed pivotally mounted tail portions of the plane 45 and the front end of the rod carries a strap 47 which encircles an eccentric 49 on the shaft 15 permitting the wings to be moved in a complete revolution while the rod 46 is reciprocated to elevate and depress the horizontally pivoted tail portions of the plane. A pin 48 connects the rod 46 with the strap 47 and said pin may be withdrawn to permit the parts to separate for convenient operation of the elevators by conventional means not shown.

It will be understood that the shaft 15 may be pivotally mounted above the cover for the cockpit or beneath the same as desired and that the wings may be removed when broken or for any other reason and the plane operated as a land vehicle.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In an aeroplane, the combination of a fuselage, transversely mounted tilting wings carried by the fuselage, a transversely mounted tail operable in unison with the wings, ailerons on said wings, a shaft mounted in each wing, means non-rotatably mounted on said shaft for operating a respective aileron, and means for oscillating said shaft, substantially as set forth.

2. In an aeroplane, the combination of a fuselage, transversely mounted tilting wings carried by the fuselage, a transversely mounted tail operable in unison with the wings, ailerons on said wings, a shaft mounted in each wing, means non-rotatably mounted on said shaft for operating a respective aileron, means for oscillating said shaft, and locking means mounted on said shaft and engaging the respective aileron when the wings are tilted on their supports, substantially as set forth.

3. In an aeroplane, the combination of a fuselage, transversely mounted tilting wings carried by the fuselage, a transversely mounted tail operable in unison with the wings, ailerons on said wings, a shaft mounted in each wing, means non-rotatably mounted on said shaft for operating a respective aileron, means for oscillating said shaft, locking means mounted on said shaft and engaging the respective aileron when wings are tilted on their supports, said wings being detachable to serve as a float, substantially as set forth.

4. The combination of an aeroplane body, a shaft detachably pivoted transversely of said body, wings mounted on said shaft at each side of the body and rotatable with the shaft a complete revolution, a train of gears associated with said shaft, and a manually operated member for operating a train of gears to rotate said shaft and the wings mounted thereon, substantially as set forth.

5. The combination of an aeroplane body, a pivoted shaft detachably mounted transversely of said body, a support on said shaft parallel to each side of the body and having its lower portion bearing against the sides of the body forming a brace, a wing extending outwardly from each of said supports, the wing at one side of the body being mounted in alinement with the wing at the opposite side, said wings being formed for the reception of fuel and to serve as a float when emptied, a tail mounted transversely of the body, a gear mounted on the detachable shaft at each side of the body of the plane, a second shaft mounted in parallel relation to the first shaft, a pair of pinions mounted on said last-mentioned shaft and engaging the gears on the detachable shaft, a gear mounted on the pinion shaft between the pinions, a shaft disposed adjacent the periphery of the gear on the pinion shaft, and a worm on said shaft engaging the gear on the pinion shaft whereby the detachable shaft and wings may be rotated by the rotation of said worm, but preventing the rotation of the detachable shaft and wings by the pressure of the wind, substantially as set forth.

6. The combination of an aeroplane body, a pivoted shaft detachably mounted transversely of said body, a support on said shaft parallel to each side of the body and having its lower portion bearing against the sides of the body forming a brace, a wing extending outwardly from each of said supports, the wing at one side of the body being mounted in alinement with the wing at the opposite side, said wings being formed for the reception of fuel and to serve as a float when emptied, a tail mounted transversely of the body, a gear mounted on the detachable shaft at each side of the body of the plane, a second shaft mounted in parallel relation to the first shaft, a pair of pinions mounted on said last-mentioned shaft and engaging the gears on the detachable shaft, a gear mounted on the pinion shaft between the pinions, a shaft disposed adjacent the periphery of the gear on the pinion shaft, a worm on said shaft engaging the gear on the pinion shaft whereby the detachable shaft and wings may be rotated by the rotation of said worm but preventing the rotation of the detachable shaft and wings by the pressure of the wind, said wings being rotatable through a complete revolution and means connecting the wings and the tail for causing them to act in synchronism for steering the plane, substantially as set forth.

7. The combination of an aeroplane body, a pivoted shaft detachably mounted transversely of said body, a support on said shaft parallel to each side of the body and having its lower portion bearing against the side of the body forming a brace, a wing extending outwardly from each of said supports, the wing at one side of the body being mounted in alinement with the wing at the opposite side, said wings being formed for the reception of fuel and to serve as a float when emptied, a tail mounted transversely of the body, a gear mounted on the detachable shaft at each side of the body of the plane, a second shaft mounted in parallel relation to the first shaft, a pair of pinions mounted on said last-mentioned shaft and engaging the gears on the detachable shaft, a gear mounted on the pinion shaft between the pinions, a shaft disposed adjacent the periphery of the gear on the pinion shaft, a worm on said shaft engaging the gear on the pinion shaft whereby the detachable shaft and wings may be rotated by the rotation of said worm but preventing the rotation of the detachable shaft and wings by the pressure of the wind, said wings being rotatable through a complete revolution, means connecting the wings and the tail for causing them to act in synchronism for steering the plane, said means comprising a connection to the tail and having its front end disposed adjacent the detachable shaft, and an eccentric on the detachable shaft for reciprocating said connection, substantially as set forth.

In witness whereof, I have hereunto set my hand at Washington, District of Columbia, this 4th day of November, A. D. nineteen hundred and twenty-seven.

DANIEL MORRIS.